(12) United States Patent
Kamata

(10) Patent No.: US 6,359,876 B1
(45) Date of Patent: Mar. 19, 2002

(54) CDMA CELLULAR COMMUNICATION SYSTEM USING FRAME OFFSET DISTRIBUTION OF ALL BASE STATIONS TO AVOID TRAFFIC PEAK

(75) Inventor: Masaki Kamata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/164,593

(22) Filed: Oct. 1, 1998

(30) Foreign Application Priority Data

Oct. 1, 1997 (JP) .............................................. 9-269037

(51) Int. Cl.[7] .............................................. H04B 7/216

(52) U.S. Cl. ........................ 370/342; 370/335; 370/337; 370/347; 455/450

(58) Field of Search ................................. 370/328, 329, 370/335, 342, 331, 336, 345, 347, 337, 344; 455/422, 450, 453

(56) References Cited

U.S. PATENT DOCUMENTS

| 5,228,029 A | * | 7/1993 | Kotzin | 370/331 |
|---|---|---|---|---|
| 5,363,404 A | * | 11/1994 | Kotzin et al. | 375/335 |
| 5,627,830 A | * | 5/1997 | Kotzin | 370/336 |
| 5,640,679 A | * | 6/1997 | Lundqvist et al. | 455/525 |
| 5,959,981 A | * | 9/1999 | Bruckert et al. | 370/331 |

* cited by examiner

*Primary Examiner*—David R. Vincent
*Assistant Examiner*—Bob A. Phunkulh
(74) *Attorney, Agent, or Firm*—Foley & Lardner

(57) ABSTRACT

In a CDMA communication system, wherein mobile stations transmit frames at timing offset from each other according to a frame offset value, a base station controller determines a distribution of frame offset values according to usage counts of the frame offset values simultaneously used by all wireless base stations and transmits a message to a requesting base station, containing the offset distribution. The requesting base station is responsive to the transmitted message for selecting a frame offset value according to the offset distribution contained in the message.

24 Claims, 2 Drawing Sheets

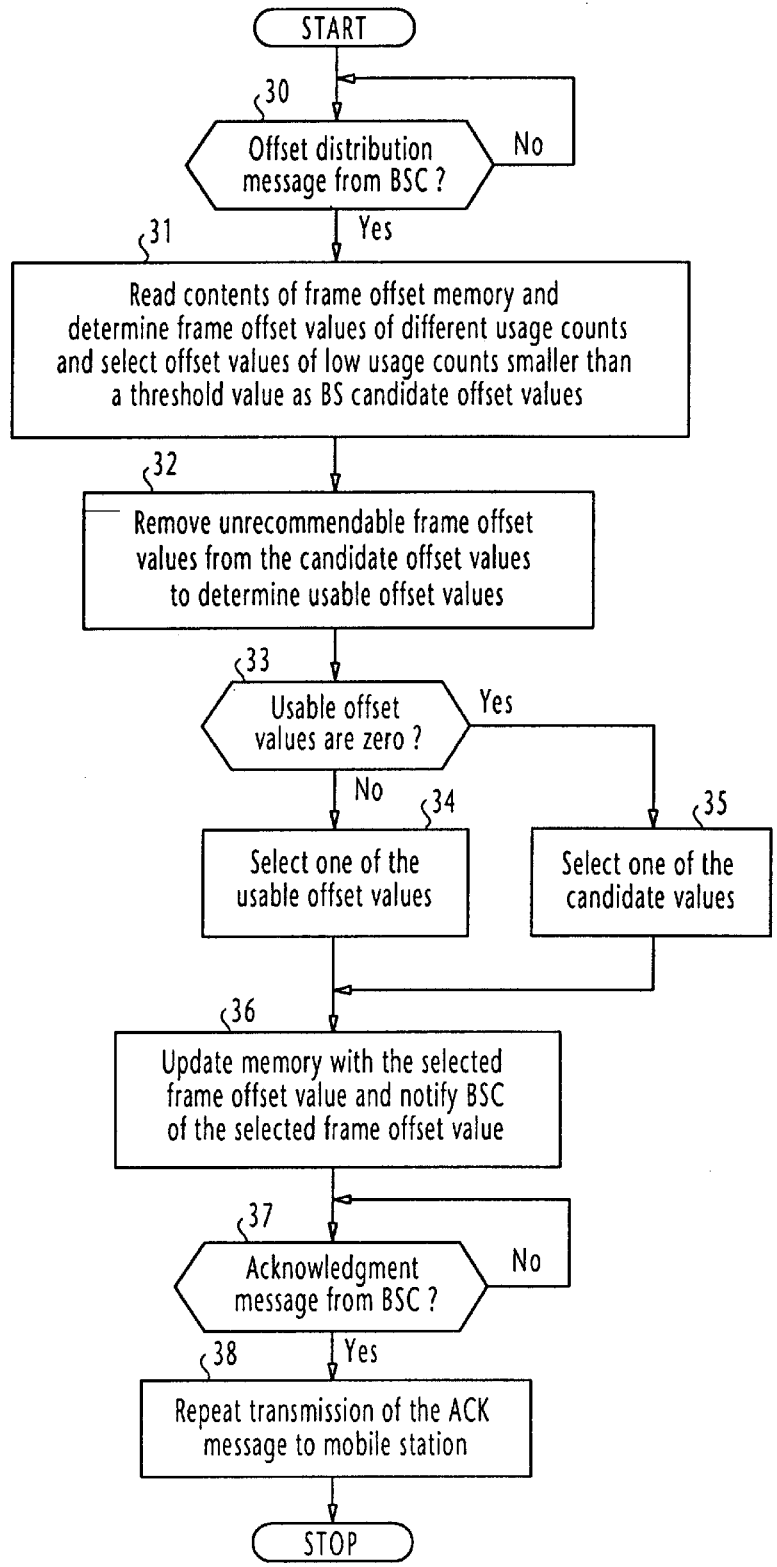

CDMA CELLULAR COMMUNICATION SYSTEM USING FRAME OFFSET DISTRIBUTION OF ALL BASE STATIONS TO AVOID TRAFFIC PEAK

BACKGROUND OF THE INVENTION

1. Field of the Invention

The present invention relates generally to code division multiple access (CDMA) communication systems, and more specifically to a CDMA cellular mobile communication system in which frame offsets are used to avoid traffic peak at base station controllers.

2. Description of the Related Art

According to the ELA/TIA Interim Standard IS-95 for code division multiple access communication systems, mobile stations are assigned unique timing offsets, known as frame offsets, by a base station to transmit their frames at such times that there is no concentration of voice traffic between the base Station and the base station controller even when that base station receives calls from a number of mobile stations at the same time.

Since a number of base stations are served by the base station controller and their frame offsets are uncorrelated with each other, their voice packets may still cause a tic peak at the base station controller if their frame offsets are not uniformly distributed over time. This is particularly true of CDMA base station controllers where conversion is necessary between the QCELP coding format of mobile stations and the PCM format of the network.

SUMMARY OF THE INVENTION

It is therefore an object of the present invention to provide a CDMA cellular communication system in which traffic peak is avoided.

According to the present invention, there is provided a code division multiple access cellular communication system, wherein mobile stations transmit frames at timing offset from each other according to a frame offset value. The system comprises a base station controller and a plurality of wireless base stations connected by respective communication links to the base station controller In order to avoid traffic peak, the base station controller determines a distribution of frame offset values according to usage counts of the frame offset values simultaneously used by all of the wireless base stations and transmitting a message to a requesting base station, containing the distribution. The requesting base station is responsive to the transmitted message for selecting a frame offset value according to the distribution contained in the message.

In a specific aspect, the base station is arranged to notify the base station controller of the selected frame offset value. The base station controller includes a frame offset memory, and is arranged to: store the selected frame offset value in the frame offset memory; determine a distribution of frame offset values stored in the frame offset memory according to usage counts, each indicating the number of same frame offset values; identify frame offset values of low usage counts as high priority frame offset values and frame offset values of high usage counts as low priority frame offset values; and transmit to the requesting base station an offset distribution message containing the identified frame offset values. The base station includes a frame offset memory and is arranged to store the selected frame offset value in the frame offset memory, determine a distribution of frame offset values stored in the frame offset memory according to usage counts each indicating the number of same frame offset values, select frame offset values of low usage counts as candidate offset values, and determine a frame offset value as the selected frame offset value, using the identified offset values and the candidate offset values.

BRIEF DESCRIPTION OF THE DRAWINGS

The present invention will be described in further detail with reference to the accompanying drawings, in which;

FIG. 3 is a flowchart of the operation of a wireless base station according to the present invention.

DETAILED DESCRIPTION

Figure 1:
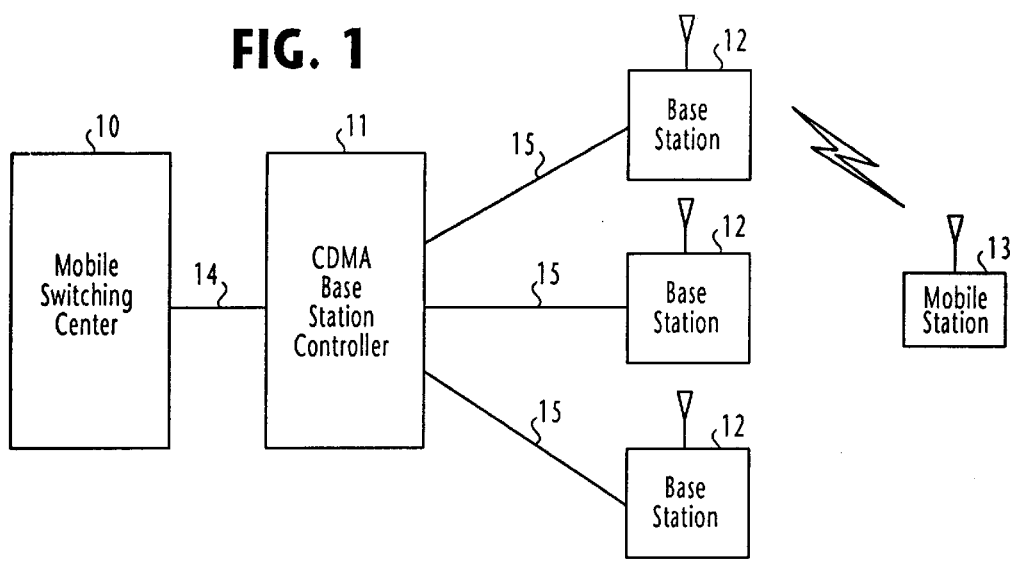
FIG. 1 is a block diagram of a typical CDMA cellular mobile communication system.

As illustrated in FIG. 1, a CDMA cellular mobile communication System designed to the ELA/TIA Interim Standard IS-95 comprises a mobile switching center 10 to which a plurality of CDMA base station controllers are connected. For simplicity, only one base station controller 11 is illustrated Base station controller 11 is a control station serving a plurality of wireless base stations 12 each covering respective cells to establish a wireless link with a user's mobile station 13. Forward channel signals from the base stations 12 to the base station controller 11 are transported on respective wired links 15 and multiplexed on a wired link 14 to the mobile switching center 10. Reverse channel signals from the mobile switching center 10 are multiplexed on the wired link 14 and demultiplexed at the base station controller 11 onto the respective links 15.

According to the present invention, the base station controller 11 cooperates with each of the base stations 12 to distribute their frame offsets so that all of their voice packets distribute over time at the base station controller. For this purpose, a frame offset memory is provided in the base station controller 11 for storing frame offset values simultaneously used by all base stations.

As will be described, when the base station controller 11 receives a traffic channel assignment request from a base station, it reads the contents of the frame offset memory and determines the distribution of stored frame offsets according to their usage counts, and identifies those onset values whose counts are smaller than a predetermined threshold as "recommendable" offset values and those offset values whose counts are greater than the threshold as "unrecommendable" offset values. Base Station Each base station 12 is also provided with a frame offset memory for storing frame offset values simultaneously used by the base station. The base station reads the contents of the frame offset memory when it sends a traffic channel assignment request to the base station controller, determines the distribution of the frame offsets according to their usage counts and selects as BS candidate values those offset values whose usage counts are smaller than a predetermined threshold.

Figure 2:
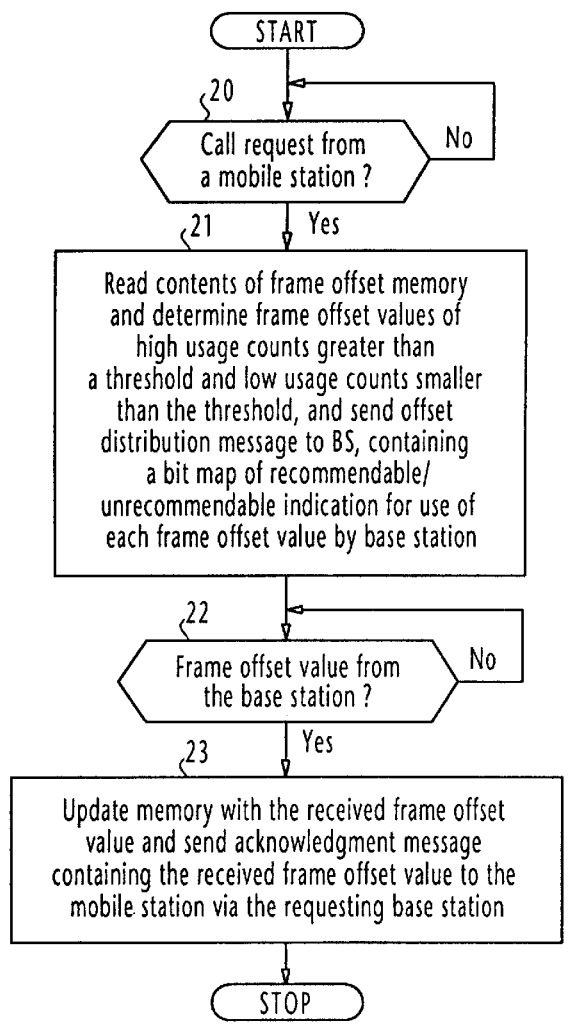
FIG. 2 is a flowchart of the operation of a base station controller according to the present invention.

In FIG. 2, the operation of the base station controller 11 begins at step 20 when it receives a call request from a mobile station via a requesting base station. At step 21, the base station controller reads the contents of its own frame offset memory, determines the distribution of stored frame offsets according to their usage counts, and identifies frame offset values of low usage counts smaller than a predetermined threshold as "recommendable" (high priority) values and frame offset values of high usage counts greater than a predetermined threshold as "unrecommendable" (low priority) values. Base station controller 11 formulates an offset distribution message containing a bit map of recommendable/unrecommendable indications for use of each frame offset value by base stations.

Referring to FIG. 3, when the requesting base station 12 receives the offset distribution message from the base station controller (step 30), it proceeds to step 31 to read the contents of its frame offset memory, determine frame offset values of different usage counts, and select as BS candidate offset values those offset values whose usage counts are smaller than a threshold values.

At step 32, the base station removes the unrecommendable frame offset values contained in the bit map data from the candidate offset values and identifies the remaining values as usable frame offset values. Flow proceeds to step 33 to check to see if the number of usable values is equal to zero. If there is at least one usable offset value, the decision at step 33 is negative and flow proceeds to step 34 to select one of the usable offset values before proceeding to step 36. If there is no usable frame offset value, the decision at step 33 is affirmative and flow proceeds to step 35 to select one of the candidate offset values before proceeding to step 36. In this way, a frame offset value is determined for the requesting mobile station.

At step 36, the requesting base station updates its frame offset memory with the determined frame offset value and notifies the base station controller of the determined frame offset value.

When the base station controller 11 receives a frame offset value from a requesting base station (step 22, FIG. 2), it updates its frame offset memory wish the received frame offset value and sends an acknowledgment message to the mobile station via the requesting base station (step 23), containing the received frame offset value.

Upon receipt of the acknowledgment message (step 37, FIG. 3), the requesting base station repeats transmission of the message to the calling mobile station (step 38).

Upon receipt of the acknowledgment message, the calling mobile station uses the recieved frame offset value as timing for the transmission of its message.

When the call is terminated, the base station updates its frame offset memory by erasing the frame offset value of the call, At the same time, the base station transmits an end-of-call message to the base station controller to erase the frame offset value of the call to update its frame offset memory.

Since the frame offset value selected by the requesting base station is of low usage count, the rate of all voice traffic at the base station controller 11 is maintained at a level below its format conversion performance.

What is claimed:

1. A code division multiple access cellular communication system, wherein mobile stations transmit frames at timing offset from each other according to a frame offset value, comprising:

a base station controller; and a plurality of wireless base stations connected by respective communication links to the base station controller for establishing wireless links to the mobile stations, the base station controller determining a distribution of frame offset values according to usage counts of the frame offset values simultaneously used by all of the base stations and transmitting a message to a requesting base station, containing the distribution, the requesting base station being responsive to the message for selecting a frame offset value according to the distribution contained in the message.

2. A code division multiple access cellular communication system as claimed in claim 1, wherein the base station is arranged to notify the base station controller of the selected frame offset value, and wherein the base station controller includes a frame offset memory and is arranged to:

store the notified frame offset value in the frame offset memory, determine a distribution of frame offset values stored in the frame offset memory according to usage counts each indicating the number of same frame offset values, identify frame offset values of low usage counts as high priority frame offset values and frame offset values of high usage counts as low priority frame offset values, and transmits an offset distribution message to the requesting base station, containing the identified frame offset values.

3. A code division multiple access cellular communication system as claimed in claim 2, wherein the base station includes a frame offset memory and is arranged to:

store the selected frame offset value in the frame offset memory, determine a distribution of frame offset values stored in the frame offset memory according to usage counts each indicating the number of same frame offset values, select frame offset values of low usage counts as candidate offset values, and determine a frame offset value as the selected frame offset value, using the identified offset values and the candidate offset values.

4. A code division multiple access cellular communication system as claimed in claim 2, wherein the base station indudes a frame offset memory and is arranged to:

store the selected frame offset value in the frame offset memory;

determine a distribution of frame offset values stored in the frame offset memory according to usage counts each indicating the number of same frame offset values, select frame offset values of low usage counts as candidate offset values.

remove the low priority frame offset vales from the candidate offset values and determine whether remaining frame offset values are present, and select one of the remaining offset values if at least one remaining frame offset value is present and select one of the candidate frame offset values if the remaining frame offset values are not present.

5. A method of determining a frame offset value for a mobile station served by one of a plurality of wireless base stations connected to a CDMA base station controller via communication links, the method comprising the steps of a) determining, at the base station controller, a distribution of frame offset values according to usage counts of the frame offset values simultaneously used by all of the base stations and transmitting a message to a requesting wireless base station, containing the distribution, and b) selecting, at the requesting base station, a frame offset value according to the distribution contained in the message.

6. The method of claim 5, wherein the step (b) comprises the step of notifying the base station controller of the selected frame offset value, and wherein the step (a) comprises the steps of:

storing, at the base station controller, the notified frame offset value in a memory;

determining a distribution of frame offset values stored in a memory according to usage counts each indicating the number of same frame offset values;

identifying frame offset values of low usage counts as high priority frame offset values and frame offset values of high usage counts as low priority frame offset values; and transmitting an offset distribution message to the requesting base station, containing the identified frame offset values.

7. The method of claim 5, wherein the step (b) comprises the steps of:

determining, at the requesting base station, a distribution of frame offset values stored in a memory according to usage counts each indicating the number of same frame offset values;

selecting frame offset values of low usage counts as candidate offset values;

determining a frame offset value as the selected frame offset value, using the identified offset values and the candidate offset values; and storing the determined frame offset value in the memory.

8. The method of claim 5, wherein the step (b) comprises the steps of:

determining, at the requesting base station, a distribution of fame offset values stored in a memory according to usage counts each indicating the number of same frame offset values;

selecting frame offset values of low usage counts as candidate offset values;

removing the low priority frame offset values from the candidate offset values and determining whether remaining frame offset values are present;

selecting one of the remaining offset values if at least one remaining frame offset value is present and selecting one of the candidate frame offset values if the remaining frame offset values are not present; and storing the selected frame offset value in the memory.

9. In a communication system having a plurality of base stations and a base station controller associated with said plurality of base stations, a method performed in said base station controller comprising:

maintaining a frame offset memory to store one or more frame offset values in use by a plurality of base stations;

determining, a distribution of said one or more frame offset values;

determining respective recommendations for said one or more frame offset values based on said distribution; and transmitting said recommendations to at least one of said plurality of base stations.

10. The method of claim 9, further comprising:

receiving a transmission from one of said plurality of base stations, said transmission comprising a selected frame offset value; and updating said frame offset memory based on said selected frame offset value.

11. The method of claim 9, wherein determining a distribution comprises associating a usage count with each of said one or more frame offset values in said frame offset memory, said usage count indicating a number of simultaneous users of a respective frame offset value.

12. The method of claim 11, wherein determining said recommendations comprises comparing said usage count with a threshold value.

13. The method of claim 12, wherein transmitting said recommendations comprises transmitting a bitmap associating each of said one or more frame offset values with one of said recommendations.

14. In a communication system comprising at least one base station controller and a plurality of associated base stations, a method performed by at least one of the associated base stations comprising:

maintaining a frame offset memory to store one or more frame offset values in use by at least one mobile station;

determining a distribution of said one or more frame offset values;

identifying a candidate set of frame offset values based on said distribution;

receiving one or more frame offset recommendations from a base station controller;

comparing said frame offset recommendations with said candidate set; and selecting a frame offset value.

15. The method of claim 14, further comprising transmitting the selected frame offset value to said at least one mobile station.

16. The method of claim 14, further comprising transmitting the selected frame offset value to said base station controller.

17. The method of claim 14, further comprising updating said frame offset memory based on the selected frame offset value.

18. The method of claim 14, wherein determining a distribution comprises associating a usage count with each of said one or more frame offset values in said frame offset memory, said usage count indicating a number of simultaneous users of a respective frame offset value.

19. The method of claim 18, wherein identifying said candidate set comprises comparing said usage count with a threshold value.

20. The method of claim 19, wherein receiving said recommendations comprises receiving a bitmap associating each of said one or more frame offset values with one of said recommendations.

21. A communication system comprising:

at least one base station controller; and one or more base stations electrically coupled to said base station controller;

wherein said base station controller is configured to identify a recommended set of frame offset values and to transmit the recommended set to said one or more base stations, and wherein each of said base stations is configured to identify a candidate set of frame offset values, compare said recommended set with said candidate set, and determine a selected frame offset value.

22. The system of claim 21, wherein said base station controller comprises a first frame offset memory to store one or more frame offset values in use by said base stations.

23. The system of claim 22, wherein said base stations each comprise a second frame offset memory to store one or more frame offset values in use by one or more associated mobile stations.

24. The system of claim 21, further comprising a bitmap representing said recommended set of frame offset values, said bitmap configured to be transmitted from said base station controller to one or more of said base stations.

\* \* \* \* \*